No. 648,732. Patented May 1, 1900.
E. B. FINCH.
SKIRT SUPPORTER.
(Application filed Aug. 19, 1899.)
(No Model.)

WITNESSES.
John N. Goodrich
C. A. Jennings

INVENTOR.
Edward B. Finch
by Parker & Burton
Attorneys.

UNITED STATES PATENT OFFICE.

EDWARD B. FINCH, OF DETROIT, MICHIGAN.

SKIRT-SUPPORTER.

SPECIFICATION forming part of Letters Patent No. 648,732, dated May 1, 1900.

Application filed August 19, 1899. Serial No. 727,744. (No model.)

*To all whom it may concern:*

Be it known that I, EDWARD B. FINCH, a citizen of the United States, residing at Detroit, county of Wayne, State of Michigan, have invented a certain new and useful Improvement in Skirt-Supporters; and I declare the following to be a full, clear, and exact description of the invention, such as will enable others skilled in the art to which it pertains to make and use the same, reference being had to the accompanying drawings, which form a part of this specification.

This invention relates to skirt-supporters, and has for its object an improved form of skirt-supporter adapted to support the skirt from the corset.

Figure 3:
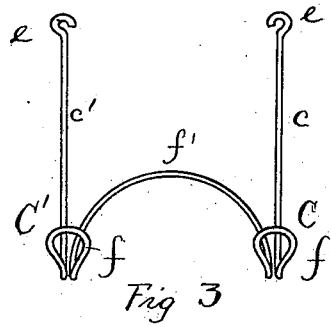
Figure 2:
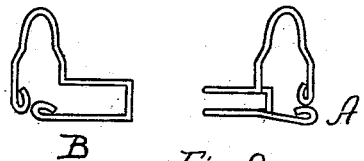
Figures 4, 5:
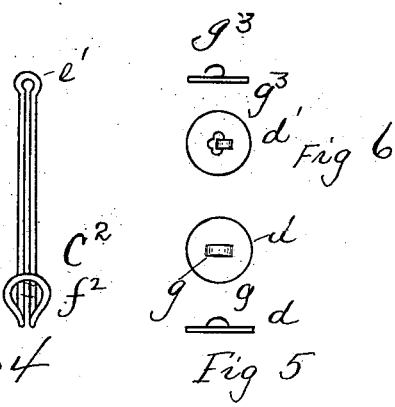
Figure 1:
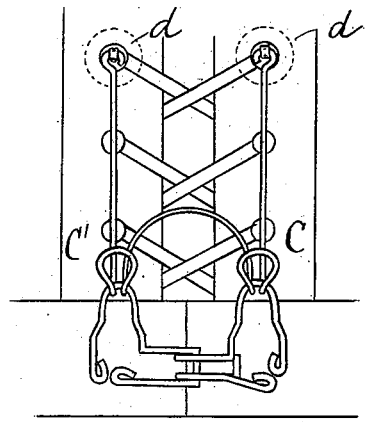
Figure 7:
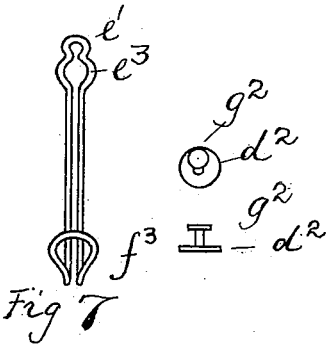

In the drawings, Figure 1 shows the complete supporter, consisting of hanging twin hooks and hooks and eyes of a form adapted to engage and hook the belt and arranged to engage the twin hooks. Fig. 2 shows the twin hooks. Fig. 3 shows the hook and eye. Fig. 4 shows a modified form of hanging-hook. Fig. 5 shows a button used with the hook of Fig. 4. Fig. 6 shows the button used with the hook of Fig. 1. Fig. 7 shows a modified form of hanging-hook. Fig. 8 shows a button used with the hook of Fig. 7.

A indicates a hook, and B indicates an eye arranged to be secured to the belt of the skirt. Each of the hook and eye pieces A and B is provided with loops, each of which constitutes an eye to be used with the hanging-hooks C C'. Depending hooks C C' hang by means of stems $c$ $c'$ from buttons $d$, that are inserted through the eyelet-holes of the corset. The stem $c$ is provided at its upper extremity with a hook $e$ and at its lower extremity with a hook $f$.

In the form shown in Fig. 3 the two hooks $f$ are joined by a bow $f'$. The bow $f'$ is of resilient material and serves to hold the two hooks C and C' together, but allows them to yield somewhat to conform to the motions of the body. The hooks $e$ are so turned that the plane passing through the curve of the hook lies flat against the body of the corset, and there is no projecting end of the wire to extend through the eyelet-hole and irritate the person. The hook $e$ engages through the struck-up eye of a disk $d$. The struck-up eye $g$ of the disk $d$ engages through the eyelet-hole, and the body of the disk $d$ is placed inside the corset, and the hook $e$ engages through the eye $g$ on the outside of the corset.

The form shown in Fig. 4 comprises a hanging-hook $C^2$ of an endless wire, having the hook $f^2$ bent sharply outward from the shank of the hook, and the shank is formed of two parallel wires lying closely adjacent, but spread to form the eye $e'$ at that end of the structure which is opposite the hook $f^2$.

In the form shown in Fig. 7 an endless wire is bent in nearly the same shape as that described in the structure of Fig. 4, except that in addition to the eye $e'$ there is a second larger expansion $e^3$ to permit the passage of the head of a button $d^2$, which button is in shape similar to an ordinary collar-button. The head $g^2$ of this button passes through the enlarged opening $e^3$, and the neck slips through the passage between the opening $e^3$ and $e'$.

With the form of hanging-hook shown in Fig. 4 the button shown in Fig. 6 is used. This is a button with a flat face-plate, and with the hook $g^3$ projecting from its front face.

With either of the forms of hanging-hooks shown the means by which the hanging-hook is attached to the corset is a button that presents a thin flat face at the inside of the corset that is entirely unobjectionable to the user. The external hook engaging with the projecting part of this button has a shank that hangs to the belt-line, or nearly to the belt-line, and there engages through the looped parts of the hook and eye A and B.

The hook and eye A and B may be made from endless wire or stamped from sheet metal, if preferred.

What I claim is—

1. In a skirt-supporter, the combination of a pair of hanging-hooks, provided with means for engaging with buttons, buttons adapted to engage through eyelet-openings of a corset and suspend said hooks, a garment-hook provided with a loop and a garment-eye provided with a loop, said hook and eye being adapted to engage over the hanging-hooks, substantially as described.

2. In combination with twin hooks adapted to support a hook and eye, and provided with engaging loops arranged to engage button-shanks, buttons provided with shanks adapted to engage through the eyelet-openings of a corset and suspend said hooks, substantially as described.

In testimony whereof I sign this specification in the presence of two witnesses.

EDWARD B. FINCH.

Witnesses:
　JOHN N. GOODRICH,
　C. C. JENNINGS.